US012588091B2

(12) United States Patent
Jia et al.

(10) Patent No.: US 12,588,091 B2
(45) Date of Patent: Mar. 24, 2026

(54) MULTI-LINK COMMUNICATIONS

(71) Applicant: Hewlett Packard Enterprise Development LP, Spring, TX (US)

(72) Inventors: Xuguang Jia, Beijing (CN); Xiaoyang Fu, Beijing (CN); Yongchang Guo, Beijing (CN)

(73) Assignee: Hewlett Packard Enterprise Development LP, Spring, TX (US)

( * ) Notice: Subject to any disclaimer, the term of this patent is extended or adjusted under 35 U.S.C. 154(b) by 492 days.

(21) Appl. No.: 18/161,953

(22) Filed: Jan. 31, 2023

(65) Prior Publication Data

US 2024/0260109 A1       Aug. 1, 2024

(51) Int. Cl.
| | |
|---|---|
| *H04W 76/15* | (2018.01) |
| *H04W 48/16* | (2009.01) |
| *H04W 84/12* | (2009.01) |

(52) U.S. Cl.
CPC ........... *H04W 76/15* (2018.02); *H04W 48/16* (2013.01); *H04W 84/12* (2013.01)

(58) Field of Classification Search
CPC . H04W 12/041; H04W 12/106; H04W 76/11; H04W 12/02; H04W 12/03; H04W 12/108
USPC ........................................................ 370/328
See application file for complete search history.

(56) References Cited

U.S. PATENT DOCUMENTS

| | | | | |
|---|---|---|---|---|
| 11,812,257 | B2 * | 11/2023 | Ho ...................... | H04W 12/041 |
| 11,888,620 | B2 * | 1/2024 | Huang .................. | H04L 1/1642 |
| 12,034,540 | B2 * | 7/2024 | Gan ...................... | H04L 1/0083 |
| 12,401,995 | B2 * | 8/2025 | Ho ....................... | H04W 12/108 |
| 12,439,241 | B2 * | 10/2025 | Kneckt ................. | H04W 12/02 |
| 2021/0007168 | A1 | 1/2021 | Asterjadhi et al. | |
| 2021/0120602 | A1 | 4/2021 | Huang et al. | |
| 2021/0120612 | A1 | 4/2021 | Park et al. | |
| 2021/0212045 | A1 | 7/2021 | Cherian et al. | |
| 2021/0274489 | A1 | 9/2021 | Fang et al. | |
| 2021/0282007 | A1 * | 9/2021 | Ho ...................... | H04W 12/041 |
| 2021/0282047 | A1 | 9/2021 | Cherian et al. | |

(Continued)

FOREIGN PATENT DOCUMENTS

| | | | | | |
|---|---|---|---|---|---|
| AU | 2021243081 | A1 * | 10/2022 | ........... | H04L 1/1642 |
| AU | 2021243081 | B2 * | 12/2023 | ............ | H04W 84/12 |

(Continued)

OTHER PUBLICATIONS

C. Chen, X. Chen, D. Das, D. Akhmetov and C. Cordeiro, "Overview and Performance Evaluation of Wi-Fi 7," in IEEE Communications Standards Magazine, vol. 6, No. 2, pp. 12-18, Jun. 2022, doi: 10.1109/MCOMSTD.0001.2100082. (Year: 2022).*

*Primary Examiner* — William D Cumming
(74) *Attorney, Agent, or Firm* — Hewlett Packard Enterprise Patent Department

(57) ABSTRACT

Systems and methods are provided that relate to multi-link communications between multi-link devices, in which a first link between a station of a first multi-link device and an access point of a second multi-link device and a second link between an access point in the first multi-link device and a station in the second multi-link device can be both established. The first link and the second link are combined for an improved multi-link communication with better performance, such as the reduction of latency, an improved power-saving mechanism and the enhanced time synchronization.

20 Claims, 12 Drawing Sheets

(56) References Cited

U.S. PATENT DOCUMENTS

| | | | |
|---|---|---|---|
| 2021/0282119 A1 | | 9/2021 | Asterjadhi et al. |
| 2021/0297184 A1* | | 9/2021 | Huang ................... H04L 1/1642 |
| 2021/0321243 A1 | | 10/2021 | Patil et al. |
| 2021/0321410 A1 | | 10/2021 | Patil et al. |
| 2023/0085657 A1* | | 3/2023 | Kneckt ............... H04L 61/5038 |
| | | | 370/328 |
| 2024/0031801 A1* | | 1/2024 | Ho ......................... H04W 12/03 |
| 2024/0129271 A1* | | 4/2024 | Chitrakar .............. H04L 61/103 |
| 2024/0260109 A1* | | 8/2024 | Jia ......................... H04W 76/11 |
| 2024/0333429 A1* | | 10/2024 | Gan ...................... H04L 1/0083 |

FOREIGN PATENT DOCUMENTS

| | | | | | |
|---|---|---|---|---|---|
| AU | 2024201611 A1 | * | 3/2024 | ............ | H04W 84/12 |
| CN | 115211155 A | * | 10/2022 | ............ | H04W 84/12 |
| CN | 115211155 B | * | 8/2024 | ............ | H04W 84/12 |
| CN | 118433931 A | * | 8/2024 | ............ | H04W 76/15 |
| CN | 118741504 A | * | 10/2024 | ............ | H04W 84/12 |
| CN | 113453380 B | * | 1/2025 | ............ | H04W 84/12 |
| CN | 119907137 A | * | 4/2025 | ............ | H04W 84/12 |
| CN | 119922755 A | * | 5/2025 | ............ | H04W 84/12 |
| CN | 119967628 A | * | 5/2025 | ............ | H04W 84/12 |
| DE | 102023127263 A1 | * | 8/2024 | ............ | H04W 76/15 |
| EP | 4117381 A1 | * | 1/2023 | ............ | H04L 1/1642 |
| JP | 7698029 B2 | * | 6/2025 | ............ | H04W 84/12 |
| KR | 20220158032 A | * | 11/2022 | ............ | H04L 1/0083 |
| TW | 202142012 A | * | 11/2021 | ......... | H04W 12/043 |
| WO | WO-2021178503 A1 | * | 9/2021 | ............ | H04W 12/06 |
| WO | WO-2021190605 A1 | * | 9/2021 | ............ | H04L 1/1642 |
| WO | WO-2022169409 A1 | * | 8/2022 | ............ | H04L 61/103 |

* cited by examiner

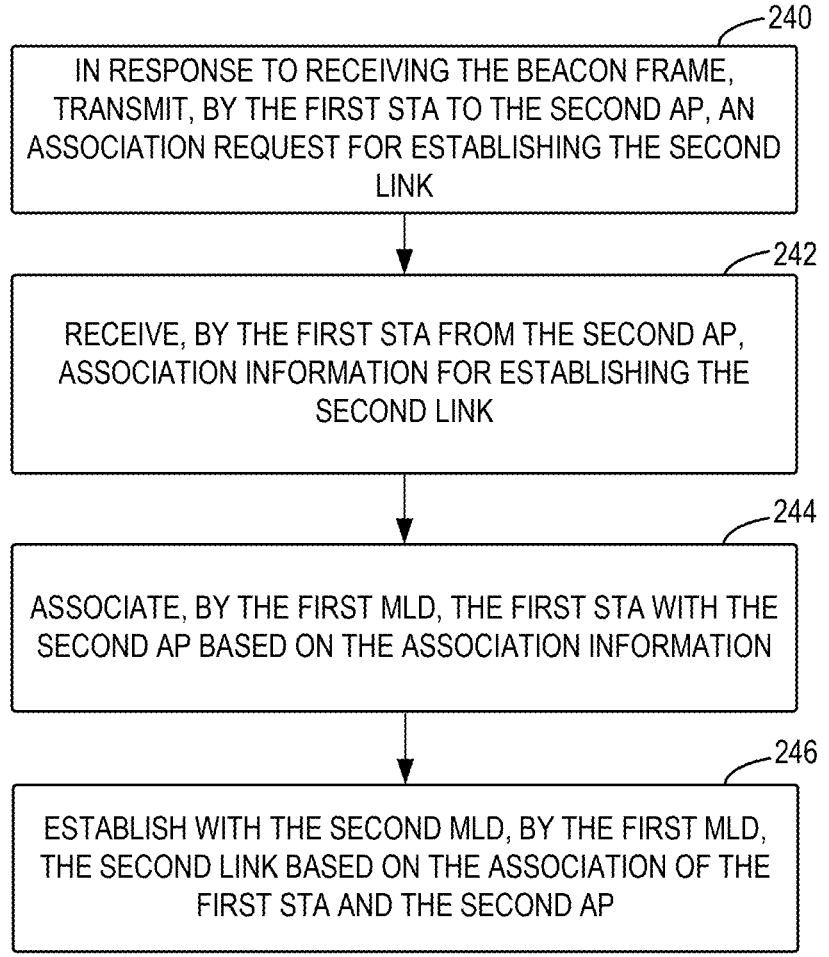

IN RESPONSE TO RECEIVING THE BEACON FRAME, TRANSMIT, BY THE FIRST STA TO THE SECOND AP, AN ASSOCIATION REQUEST FOR ESTABLISHING THE SECOND LINK
240

RECEIVE, BY THE FIRST STA FROM THE SECOND AP, ASSOCIATION INFORMATION FOR ESTABLISHING THE SECOND LINK
242

ASSOCIATE, BY THE FIRST MLD, THE FIRST STA WITH THE SECOND AP BASED ON THE ASSOCIATION INFORMATION
244

ESTABLISH WITH THE SECOND MLD, BY THE FIRST MLD, THE SECOND LINK BASED ON THE ASSOCIATION OF THE FIRST STA AND THE SECOND AP
246

FIG. 2B

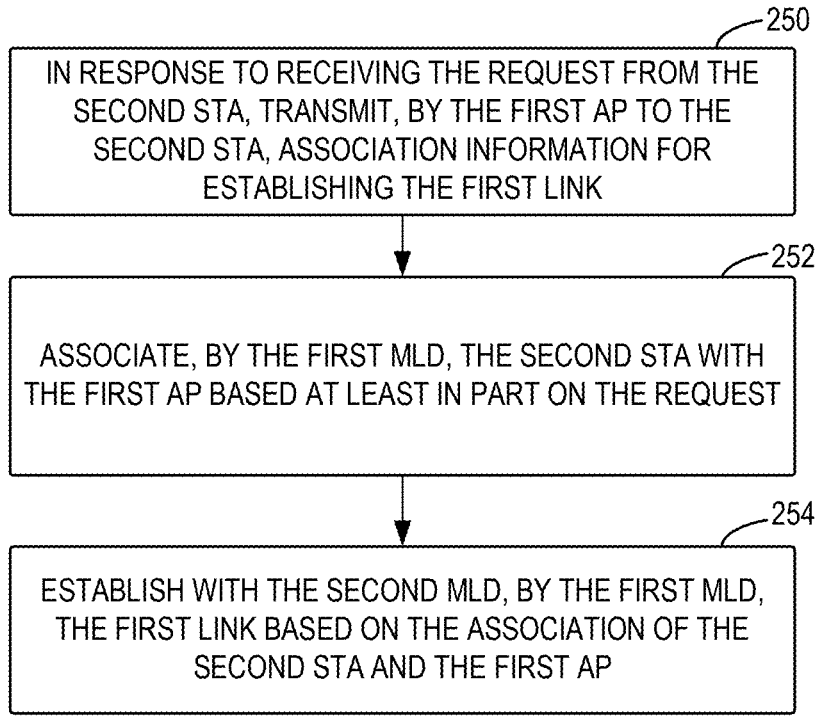

IN RESPONSE TO RECEIVING THE REQUEST FROM THE SECOND STA, TRANSMIT, BY THE FIRST AP TO THE SECOND STA, ASSOCIATION INFORMATION FOR ESTABLISHING THE FIRST LINK

250

ASSOCIATE, BY THE FIRST MLD, THE SECOND STA WITH THE FIRST AP BASED AT LEAST IN PART ON THE REQUEST

252

ESTABLISH WITH THE SECOND MLD, BY THE FIRST MLD, THE FIRST LINK BASED ON THE ASSOCIATION OF THE SECOND STA AND THE FIRST AP

UPDATE, BY THE FIRST MLD, THE BASIC INFORMATION
WITH PERFORMING A SCANNING PROCESS PERIODICALLY

522

DISCONNECT, BY THE FIRST MLD, THE ESTABLISHED ONE
OR BOTH OF THE FIRST AND SECOND LINKS BASED ON
THE UPDATED BASIC INFORMATION

524

REESTABLISH, BY THE FIRST MLD, A COMMUNICATION
LINK BETWEEN THE FIRST MLD AND THE SECOND MLD

600

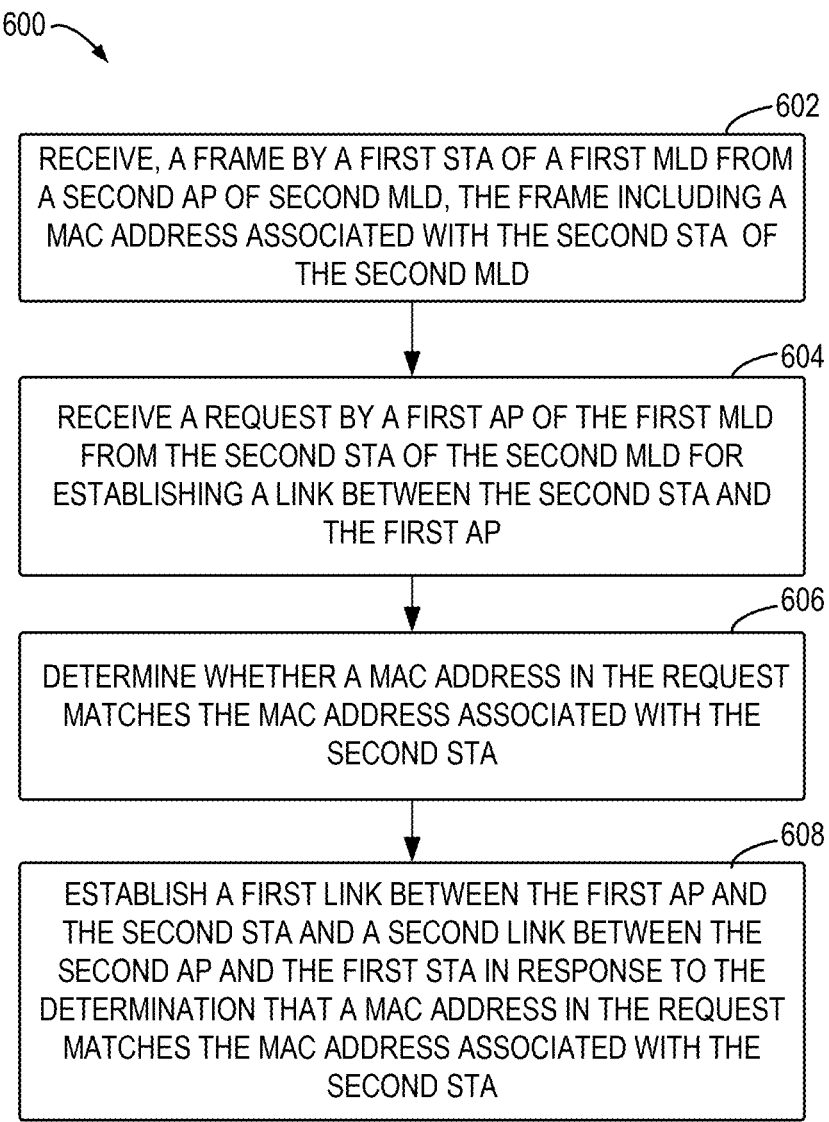

602

RECEIVE, A FRAME BY A FIRST STA OF A FIRST MLD FROM A SECOND AP OF SECOND MLD, THE FRAME INCLUDING A MAC ADDRESS ASSOCIATED WITH THE SECOND STA OF THE SECOND MLD

604

RECEIVE A REQUEST BY A FIRST AP OF THE FIRST MLD FROM THE SECOND STA OF THE SECOND MLD FOR ESTABLISHING A LINK BETWEEN THE SECOND STA AND THE FIRST AP

606

DETERMINE WHETHER A MAC ADDRESS IN THE REQUEST MATCHES THE MAC ADDRESS ASSOCIATED WITH THE SECOND STA

608

ESTABLISH A FIRST LINK BETWEEN THE FIRST AP AND THE SECOND STA AND A SECOND LINK BETWEEN THE SECOND AP AND THE FIRST STA IN RESPONSE TO THE DETERMINATION THAT A MAC ADDRESS IN THE REQUEST MATCHES THE MAC ADDRESS ASSOCIATED WITH THE SECOND STA

FIG. 6A

DETERMINE, BY THE FIRST MLD, A FIRST SUBSET OF THE
FIRST SET OF LINKS AS DOWNLINKS

DETERMINE, BY THE FIRST MLD, A SECOND SUBSET OF
THE FIRST SET OF LINKS AS UPLINKS

COMMUNICATE WITH THE SECOND SETS OF APS, BY THE
FIRST SET OF APS, ON THE FIRST AND SECOND SUBSETS
OF THE FIRST SET OF LINKS

DETERMINE, BY THE FIRST MLD, A THIRD SUBSET OF THE SECOND SET OF LINKS AS DOWNLINKS

DETERMINE, BY THE FIRST MLD, A FOURTH SUBSET OF THE SECOND SET OF LINKS AS UPLINKS

COMMUNICATE WITH THE SECOND SETS OF APS ON THE THIRD AND FOURTH SUBSETS OF THE SECOND SET OF LINKS

700 —

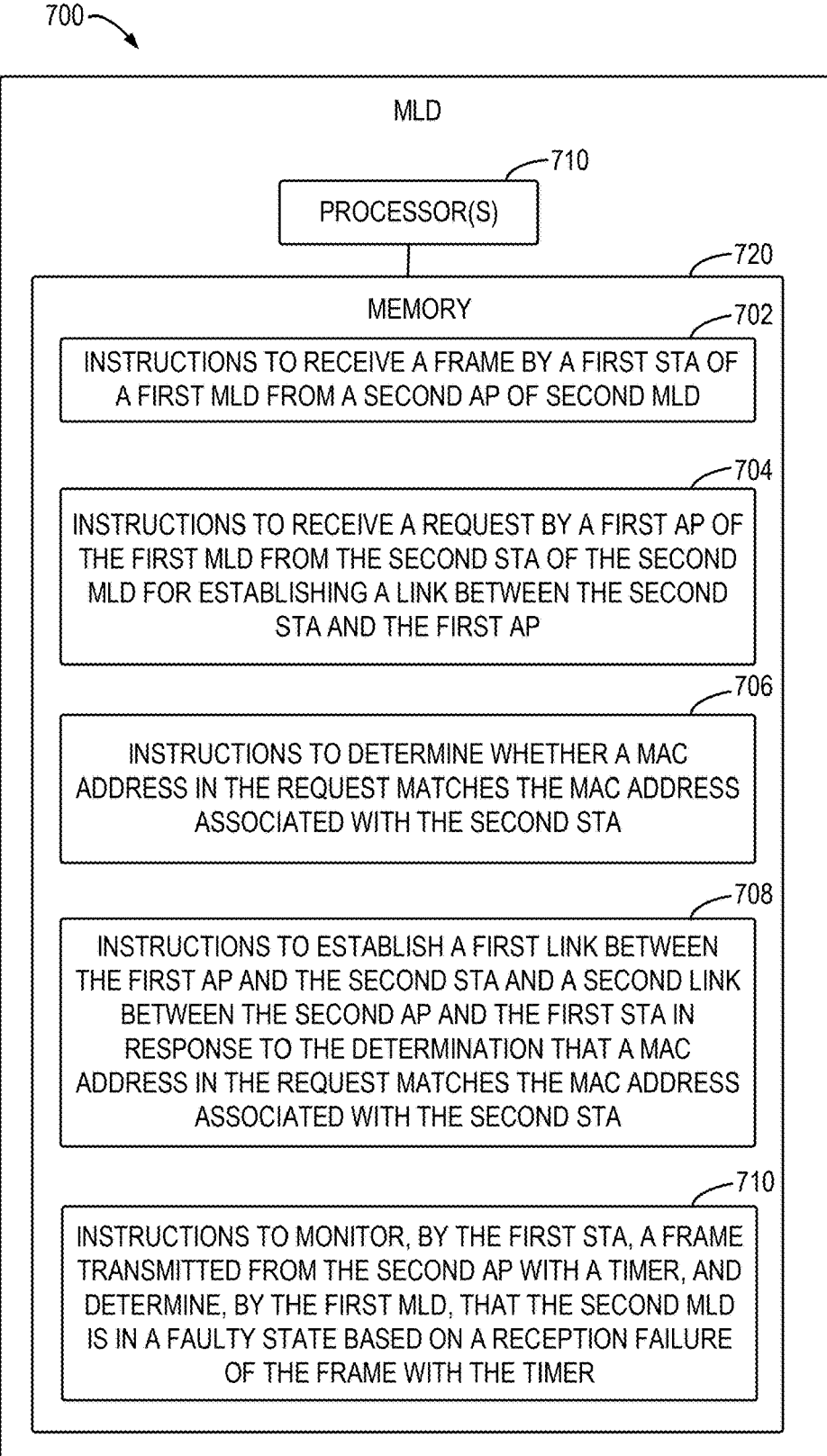

MLD

710

PROCESSOR(S)

720

MEMORY

702

INSTRUCTIONS TO RECEIVE A FRAME BY A FIRST STA OF A FIRST MLD FROM A SECOND AP OF SECOND MLD

704

INSTRUCTIONS TO RECEIVE A REQUEST BY A FIRST AP OF THE FIRST MLD FROM THE SECOND STA OF THE SECOND MLD FOR ESTABLISHING A LINK BETWEEN THE SECOND STA AND THE FIRST AP

706

INSTRUCTIONS TO DETERMINE WHETHER A MAC ADDRESS IN THE REQUEST MATCHES THE MAC ADDRESS ASSOCIATED WITH THE SECOND STA

708

INSTRUCTIONS TO ESTABLISH A FIRST LINK BETWEEN THE FIRST AP AND THE SECOND STA AND A SECOND LINK BETWEEN THE SECOND AP AND THE FIRST STA IN RESPONSE TO THE DETERMINATION THAT A MAC ADDRESS IN THE REQUEST MATCHES THE MAC ADDRESS ASSOCIATED WITH THE SECOND STA

710

INSTRUCTIONS TO MONITOR, BY THE FIRST STA, A FRAME TRANSMITTED FROM THE SECOND AP WITH A TIMER, AND DETERMINE, BY THE FIRST MLD, THAT THE SECOND MLD IS IN A FAULTY STATE BASED ON A RECEPTION FAILURE OF THE FRAME WITH THE TIMER

FIG. 7

MULTI-LINK COMMUNICATIONS

BACKGROUND

A wireless local network, such as a Wi-Fi (i.e., Institute of Electrical and Electronics Engineers (IEEE) 802.11), may include one or more access points (APs) that provide a shared wireless communication medium for use by a number of client devices also referred to as stations (STAs). The APs may enable a mobile device to communicate with other devices via the network.

To improve data throughput, a multi-link operation (MLO) is introduced, and the AP may communicate with one or more STAs over multiple concurrent communication links. Also, multiple virtual APs for multiple Basic Service Sets (BSSs) may be set up for establishing communication links with different STAs. However, in a complex network environment, improved communication between APs and STAs is still desirable.

BRIEF DESCRIPTION OF THE DRAWINGS

Through the following detailed descriptions with reference to the accompanying drawings, the above and other objectives, features, and advantages of the example implementations disclosed herein will become more comprehensible. In the drawings, several example implementations disclosed herein will be illustrated in an example and in a non-limiting manner, where:

FIG. 2B illustrates operations that may be performed by the example multi-link communication network of FIG. 2A;

FIG. 2C illustrates operations that may be performed by the example multi-link communication network of FIG. 2A;

FIG. 5C illustrates further aspects of the example creation process of FIG. 5A;

FIG. 6A illustrates a flow chart of an example method for multi-link communication in accordance with some implementations of the present disclosure;

FIG. 7 illustrates a block diagram of an example multi-link device (MLD) in accordance with some implementations of the present disclosure.

DETAILED DESCRIPTION

The MLO refers to a plurality of communication links established between multi-link devices (MLDs). One example of an MLD is an AP MLD, which may include a plurality of APs. Another example of an MLD device is an STA MLD, which may include a plurality of STAs. Each of the plurality of communication links is established between one of the plurality of APs and the corresponding one of the plurality of STAs.

Although the MLO between MLDs may reduce the latency in data transmission, a latency issue may still occur in dense environments for multi-clients downlink (DL)/uplink (UL) traffic. To keep APs in an MLD to be active, all of the links associated with the APs are required to be maintained, and it is desirable for a better power-saving mechanism in MLDs. In addition, the implementation of time synchronization between APs and STAs is essential for the communication network. In this regard, APs can adopt a correction scheme for time synchronization, for example, with timestamps encoded in beacon frames. However, there are also some challenges in time synchronization due to the unidirectional correction on the AP MLDs side. For example, a slow timer issue may occur for some reasons, such as long time running, component aging, and hardware faults, but the MLDs fail to detect such slow timer issues by themselves.

To overcome one or more of the disadvantages above, implementations of the present disclosure provide a solution for multi-link communication between MLDs, in which the MLDs may be the devices that each has the combined functionality of an STA and an AP when connected with another device. In other words, one MLD is capable of communicating with another MLD via a link between an STA of the one MLD and an AP of the other MLD when acting as an STA and is capable of communicating with the other MLD via a link between an AP of the one MLD and an STA of the other MLD when acting as an AP.

According to implementations of the present disclosure, the AP of the MLD can carry the information of the STA of the MLD with a frame broadcast to the STA of the other MLD. When the frame is received at the other MLD, the other MLD may extract the information of the STA of the MLD from the frame and learn that both links can be established with the MLD. With the links of the present disclosure, an improved multi-link communication can be implemented with better performance, such as the reduction of latency, an improved power-saving mechanism, and enhanced time synchronization.

The principle and implementations of the present disclosure will be described in detail below with reference to the accompanying drawings. However, it is to be noted that these implementations are illustrated as examples and are not intended to limit the scope of the present application in any way.

Figure 1:
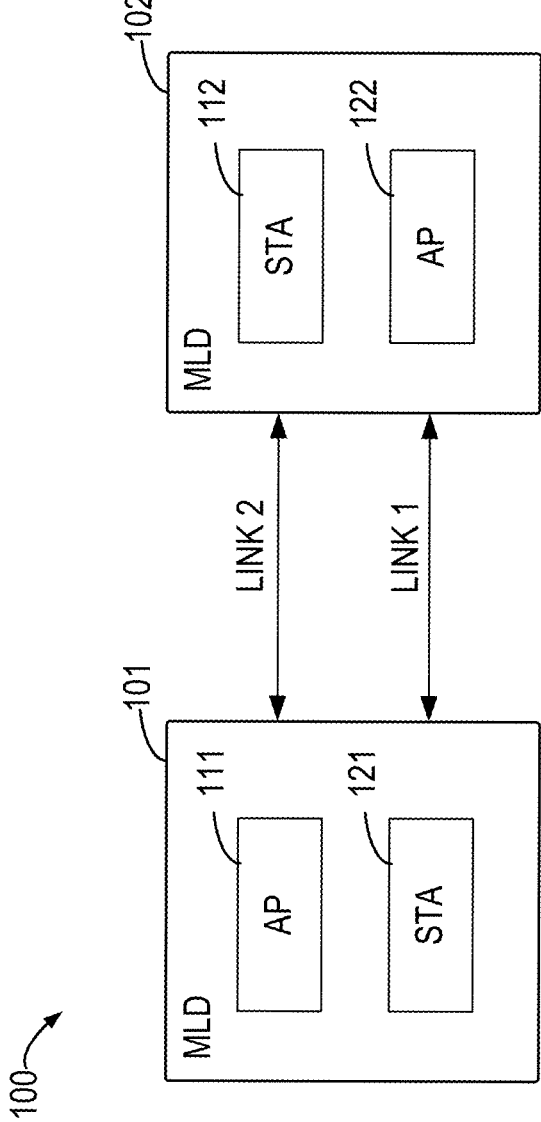
FIG. 1 illustrates a block diagram of an example multi-link communication network in accordance with some implementations of the present disclosure.

FIG. 1 illustrates a block diagram of an example multi-link communication network 100 according to implementations of the present disclosure. In the multi-link communication network 100, an MLD (for example, an MLD 101) may communicate with another MLD (for example, an MLD 102) via two communication links (a first link and a second link). The first and second links herein are used to distinguish different links on different radio channels in different frequency bands (such as the 2.4 GHz, 5 GHz, 6 GHZ, or 60 GHz bands). For example, the first link may operate on the 2.4 GHz radio channel, while the second link may operate on the 5 GHz radio channel.

As illustrated in FIG. 1, the MLD 101 includes an AP 111 and an STA 121, and the MLD 102 includes an STA 112 and an AP 122. The first link (shown as LINK 1 in FIG. 1) is established between the STA 121 and the AP 122, and the second link (shown as LINK 2 in FIG. 1) is established between the AP 111 and the STA 112. Herein, each of the MLDs may be considered as an "STA MLD" when functioning as an STA, as an "AP MLD" when functioning as an AP, or as both the "STA MLD" and the "AP MLD" when functioning as an STA and an AP simultaneously. In other words, an MLD may act as an STA MLD, an AP MLD, or both for other MLD to be connected.

In the multi-link communication network 100, the STA of each of the MLDs may be in a sleep mode, thereby reducing the power consumption of the MLDs and providing a green multi-link communication network. Other advantages of implementations of the present disclosure will be described with reference to the other example implementations as described below.

It should be understood that the described multi-link communication network in the disclosure is capable of transmitting and receiving radio frequency (RF) signals according to the Institute of Electrical and Electronics Engineers (IEEE) 802.11 standards. In addition, the described multi-link communication network in the disclosure can transmit and receive RF signals according to one or more of the following technologies or techniques: code division multiple access (CDMA), time division multiple access (TDMA), frequency division multiple access (FDMA), orthogonal FDMA (OFDMA), single-carrier FDMA (SC-FDMA), single-user (SU) multiple-input multiple-output (MIMO), and multi-user (MU) MIMO. The described implementations also can be implemented using other wireless communication protocols or RF signals suitable for use in one or more of a wireless personal area network (WPAN), a wireless local area network (WLAN), a wireless wide area network (WWAN), or an internet of things (IoT) network.

Figure 2A:
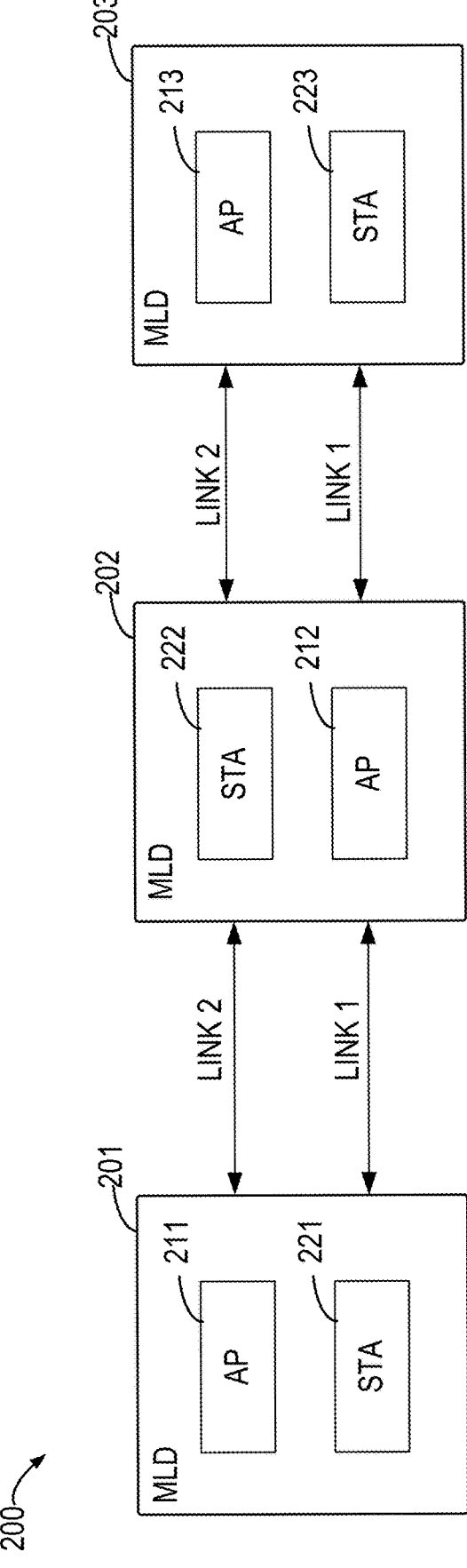
FIG. 2A illustrates a block diagram of another example multi-link communication network in accordance with some implementations of the present disclosure.
Figure 3:
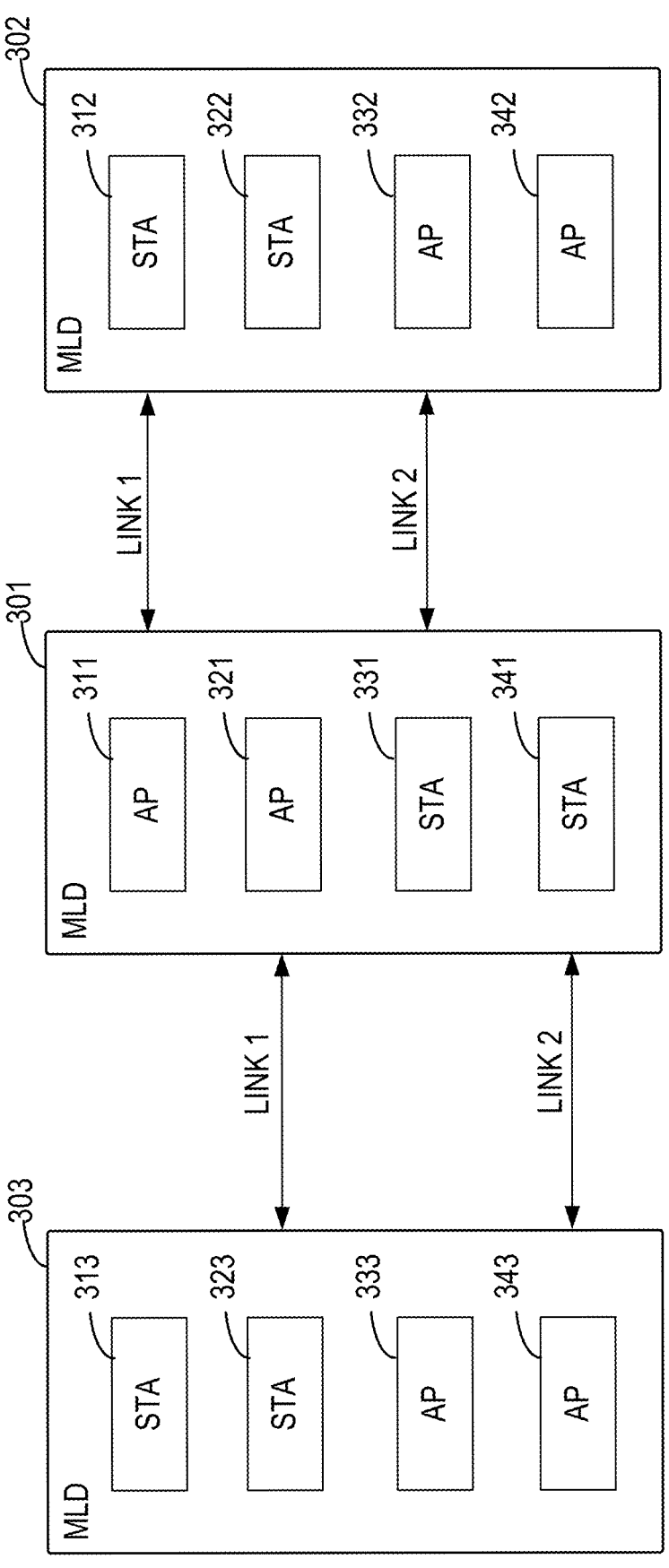
FIG. 3 illustrates a block diagram of yet another example multi-link communication network in accordance with some implementations of the present disclosure.
Figure 4:
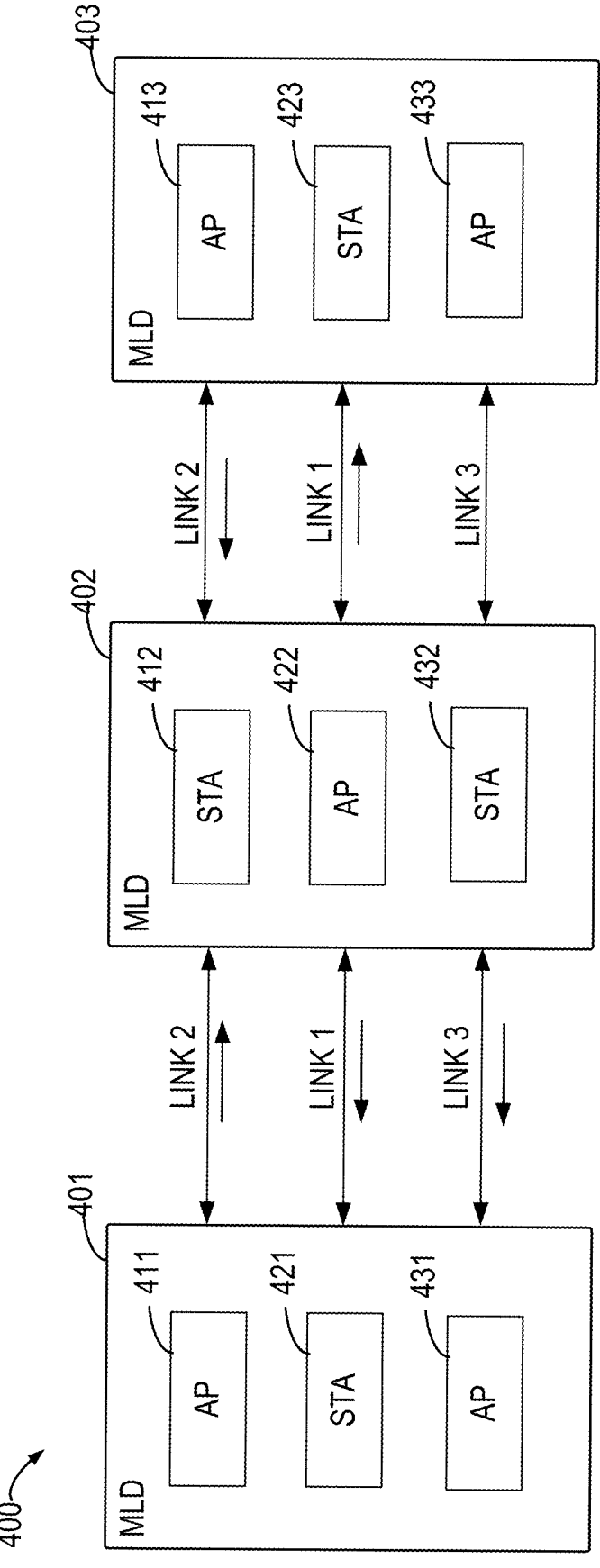
FIG. 4 illustrates an example multi-link communication with traffic steering in accordance with some implementations of the present disclosure.

Although the multi-link communication network 100 is illustrated with two MLDs and two communication links, any number of MLDs and communication links can be present in implementations of the present disclosure, for example, as shown in FIGS. 2A, 3 and 4.

FIG. 2A illustrates a block diagram of another example multi-link communication network 200 according to implementations of the present disclosure. In the multi-link communication network 200, one of the MLDs shown in FIG. 2A (for example, an MLD 202) may communicate with any of the other MLDs (for example, MLDs 201, 203) via one or both of two communication links in different frequency bands. One of the two communication links between the MLD 201 and the MLD 202 is established between an AP 211 in the MLD 201 and an STA 222 in the MLD 202, and the other of the two communication links between the MLD 201 and the MLD 202 is established between an STA 221 in the MLD 201 and an AP 212 in the MLD 202. Likewise, one of the two communication links between the MLD 202 and the MLD 203 is established between the STA 222 in the MLD 202 and an AP 213 in the MLD 203, and the other of the two communication links between the MLD 202 and the MLD 203 is established between the AP 212 in the MLD 202 and an STA 232 in the MLD 203. For example, the AP 212 of MLD 202 may communicate with the STA 221 of MLD 201 on a 2.4 GHz radio channel and communicate with the STA 223 of MLD 203 on a 5 GHz radio channel. The STA 222 of the MLD 202 may communicate with the AP 211 of MLD 201 on a 60 GHz radio channel and communicate with the AP 213 of the MLD 203 on a 6 GHz radio channel.

For the purpose of discussion, the implementation of the multi-link communication network 200 will be described with MLDs 201-202 in FIG. 2A in detail. First, the AP 211 of the MLD 201 transmits a frame to the STA 222 of MLD 202, and the frame may be a beacon frame and include a medium access control (MAC) address associated with the STA 221. In some example implementations, the MAC address associated with the STA 221 may be added to a vender element in the beacon frame. For example, the indication of multi-link and the advertisement of the MAC address of the STA may be implemented based on multi-link elements and beacon vendor information element (IE). In addition, a multi-link control field may be used to indicate the support of multi-link with the reserved value, and the MAC address associated with the STA 221 may be broadcast with STA information in the vendor element. The STA information may further include a field indicating an index of the STA 221 except for the MAC address associated with the STA 221.

In addition or alternatively, the STA information may further include a field indicating a predetermined type of the link to be established with the STA 221. The field indicating a predetermined type of the link to be established with the STA 221 may be used to determine the first link to be created as an uplink or a downlink. Further, the STA information may include a field indicating which radio channel the STA 221 is expected to run on. For example, the field indicating which radio channel the STA 221 is expected to run on may be used to instruct the first link to operate on a radio channel with 5 GHz frequency band. In addition or alternatively, the STA information may further include a field indicating a predetermined basic service set identifier associated with the STA 221. The field indicating a predetermined basic service set identifier associated with the STA 221 may be used to indicate that the STA 221 is associated with the AP 211. When the beacon frame is received by the STA of the MLD 202, the MLD 202 obtains the MAC address associated with the STA 221 and learns that the MLD 201 supports the multi-link function and is capable of communicating with the MLD 202 via two communication links.

In some example implementations, after receiving the beacon frame, the STA 222 may transmit an association request to the AP 211 for establishing a second link between the STA 222 and the AP 211. When the association request is received, the AP 211 may transmit the association information for establishing the second link. Accordingly, the STA 222 may receive the association information, and the MLD 202 may associate the STA 222 with the AP 211 based at least in part on the association information. Thus, the MLD 202 may establish the second link based on the association of the STA 222 and the AP 211. That is, and as illustrated in FIG. 2B, in response to receiving the beacon frame, the first STA transmits to the second AP, an association request for establishing the second link (240). The first STA may receive from the second AP, association information for establishing the second link (242). The first MLD may associate the first STA with the second AP based on the association information (244). The first MLD may establish with the second MLD, the second link based on the association of the first STA and the second AP (246).

In addition, the AP 212 may receive a request from the STA 221 for establishing a first link between the STA 221 and the AP 212. When the request is received, the MLD 202 obtains a MAC address from the request and determines whether the MAC address in the request matches the MAC address in the beacon frame received from the AP 211. If the MAC address in the request matches the MAC address in the beacon frame, the AP 212 may transmit association information to the STA 221 for establishing the first link, and the MLD 202 may associate the STA 212 with the AP 221. Thus, the MLD 202 may establish the first link based on the association of the STA 221 and the AP 212. That is, and as illustrated in FIG. 2C, in response to receiving the request from the second STA, the first AP may transmit to the second STA, association information for establishing the first link (250). The first MLD may associate the second STA with the first AP based at least in part on the request (252). The first MLD may establish with the second MLD, the first link based on the association of the second STA and the first AP (254).

In this way, both the first link between the AP 212 and the STA 221 and the second link between the AP 211 and the STA 222 can be established, and the MLD 202 can communicate with the MLD 201 via one or both of the first and second links. In an example implementation, the establishment of the first link may be independent of the establishment of the second link. Even if the MAC address in the request matches the MAC address in the beacon frame, there is no association information from the AP 212 to the STA 221 for establishing the first link. In another example implementation, the STA 221 may use keys of the AP 211 and the STA 222 to encrypt the frames.

Although each of the MLDs in FIGS. 1 and 2A are shown as having an AP and an STA, the number of AP(s) and STA(s) does not limit the present disclosure to the above-described implementation. In other example implementations, each of the MLDs may include multiple APs and multiple STAs, which may be used to communicate with different MLDs on different radio channels, respectively. More details will be further explained with reference to FIG. 3.

FIG. 3 illustrates a block diagram of yet another example of multi-link communication network 300 according to implementations of the present disclosure. In the multi-link communication network 300, an MLD 301 may include APs 311, 321, and STAs 331, 341, and may communicate with other MLDs (for example, MLDs 302, 303) via respective communication links. As shown in FIG. 3, the communication links between the MLD 301 and the MLD 302 may include a link established between an AP 311 and an STA 312 and a link established between an STA 331 and an AP 332. The communication links between the MLD 301 and the MLD 303 may include a link established between an AP 321 and an STA 323 and a link established between an STA 341 and an AP 343.

Although not shown, the APs and STAs in MLDs 302, 303 may connect to the STAs and APs in other MLDs not shown in FIG. 3. In other implementations, an STA 322 of the MLD 302 may connect to an AP 333 of the MLD 303, and an AP 342 of the MLD 302 may connect to an STA 313 of the MLD 303. Alternatively, an STA 322 of the MLD 302 may connect to another AP of the MLD 301 except for the APs 311, 321, and an AP 342 of the MLD 302 may connect to another STA of the MLD 301 except for the STAs 331, 341.

FIG. 4 illustrates an example multi-link communication with traffic steering in accordance with some implementations of the present disclosure. As shown in FIG. 4, the MLDs 401, 403 may include two APs and one STA, and the MLD 402 may include one AP and two STAs. There are three links between the MLD 401 and the MLD 402, including a link between an AP 411 and an STA 412 on a radio channel (LINK2), a link between an AP 422 and an STA 421 on a different radio channel (LINK1), and a link between an AP 431 and an STA 432 on another different radio channel (LINK3). The implementation of links between other MLDs (for example, the MLD 402 and the MLD 403) is similar to that of MLDs 401-402 and will not be repeated herein.

A traffic flow steering strategy may be applied to the communications between the MLD 401 and the MLD 402. As shown in FIG. 4, the link (considered as a downlink) between an AP 411 and an STA 412 and a link (considered as a downlink) between an AP 422 and an STA 423 are utilized for transmitting a signal from the MLD 401 to the MLD 403. When the signal is received, the MLD 403 may transmit an Acknowledge (ACK) to the MLD 401. Considering that there are huge traffics in one direction (e.g., from the MLD 402 to the MLD 401) than in the other direction (e.g., from the MLD 401 to the MLD 402), a link (considered as a downlink) between an AP 413 and an STA 412, the link (considered as a downlink) between an AP 422 and an STA 421, and the link (considered as an uplink) between an AP 431 and an STA 432 may be utilized for transmitting the ACK. In this way, radio channel resources can be utilized in a more efficient manner, thereby reducing the latency in the communication. It is to be understood that any number of links may be used for transmitting a signal and that each of the links may be used as an uplink or a downlink.

In some example implementations, various traffic flow steering strategies can be adopted according to the selection of links for certain transmissions. For example, when there are five links between the MLD 401 and the MLD 402, each can be the first link or the second link. An implementation may select two links from the five links as downlinks, and three links as uplinks, as needed. In an implementation, the determination of each link as an uplink or a downlink may depend on the specific communication or the field indicating a predetermined type of link to be established with an STA of an MLD in the STA information.

In a highly dense network environment where a client of multi-clients has to contend with other clients for single-user (SU) transmission, the implementation of any of the various traffic flow steering strategies described above is beneficial. Since an AP is capable of polling the buffer status of clients for uplink MU transmission to avoid chaos and do better traffic scheduling for downlink with its high-performance CPU, high-capacity storage, and strong Wi-Fi capability, there are more downlink traffics than uplink traffics in practice, the link with the transmission direction from an AP to an STA is more desirable than the link with the transmission direction from the STA to the AP.

Further, with any multi-link communication networks as described above, the MLDs can synchronize with each other via the first and second links. For example, the STA in the MLD 201 may monitor the beacon frames from the AP in the MLD 202. If the MLD 202 is in a faulty state, for example, with a hardware fault, the MLD 202 may experience some issues, such as a beacon TX failure, slow timer in timestamp, and so forth, and such issues will be detected by the MLD 201 during the certain period based on target beacon transmission time (TBTT). In this way, the synchronization between MLDs can be improved with the detection of slow timer or any other time-based issues on Wi-Fi interfaces, thereby enhancing the stability of the multi-link communication network.

As described above, any of MLDs may be operated in any of the various modes. In order to better understand the present invention, various modes will be described below with reference to the MLDs in FIGS. 3 and 4.

In a first type of mode, only one or more AP(s) in an MLD are connected to respective STA(s) in another MLD. In an example implementation, the MLD 301 may communicate with the MLD 303 via two communication links. One of the two communication links is established between the AP 311 and the STA 313, and the other of the two communication links is established between the AP 321 and the STA 323. In another example implementation, the MLD 301 may communicate with the MLD 302 via another two communication links. For example, one of the two communication links is established between the AP 332 and the STA 331, and the other of the two communication links is established between the AP 342 and the STA 341.

In a second type of mode, only one or more AP(s) in an MLD are connected to respective STA(s) in another MLD, while a traffic flow steering strategy is applied to the communications between such two MLDs. In an example implementation, the communication link between the AP 311 and the STA 313, the communication link between the AP 321 and the STA 323, the communication link between the AP 332 and the STA 331, and the communication link between the AP 342 and the STA 341 may be utilized for the transmission from the MLD 303 to the MLD 302. Only the communication link between the AP 311 and the STA 313 and the communication link between the AP 342 and the STA 341 may be utilized for the transmission from the MLD 302 to the MLD 303.

In a third type of mode, one or more AP(s) in an MLD are connected to respective STA(s) in another MLD, and simultaneously, one or more STA(s) in the MLD are connected to respective AP(s) in another MLD, for example, as shown in FIG. 3.

In a fourth type of mode, one or more AP(s) in an MLD are connected to respective STA(s) in another MLD, and simultaneously, one or more STA(s) in the MLD are connected to respective AP(s) in the another MLD, while a traffic flow steering strategy is applied to the communication between such two MLDs, for example, as shown in FIG. 4.

An implementation of multi-link communication will be described below with reference to FIG. 5. FIG. 5 illustrates an example creation process 500 of multi-link communication in accordance with some implementations of the present disclosure.

As shown in FIG. 5, at 502, an MLD may acquire basic information on other MLDs in the multi-link communication network, and the basic information may be used to determine with which MLD is to be connected and which mode the MLD is operated. The basic information may comprise such as a received signal strength indicator (RSSI), the number of links, physical layer (PHY) capability, mode supported list, etc., and may be processed by a specific algorithm as input parameters. The specific algorithm is designed with an output indicating a pair of candidate MLDs to be connected with each other at 504, and the mode selection on the pair of candidate MLDs at 506, and may be done on the AP side, a controller, or a cloud center. If a pair of candidate MLDs is found, the pair of candidate MLDs performs the connection process and communicates according to the corresponding type of mode at 508. If a pair of candidate MLDs is not found, the scanning continues.

Figure 5A:
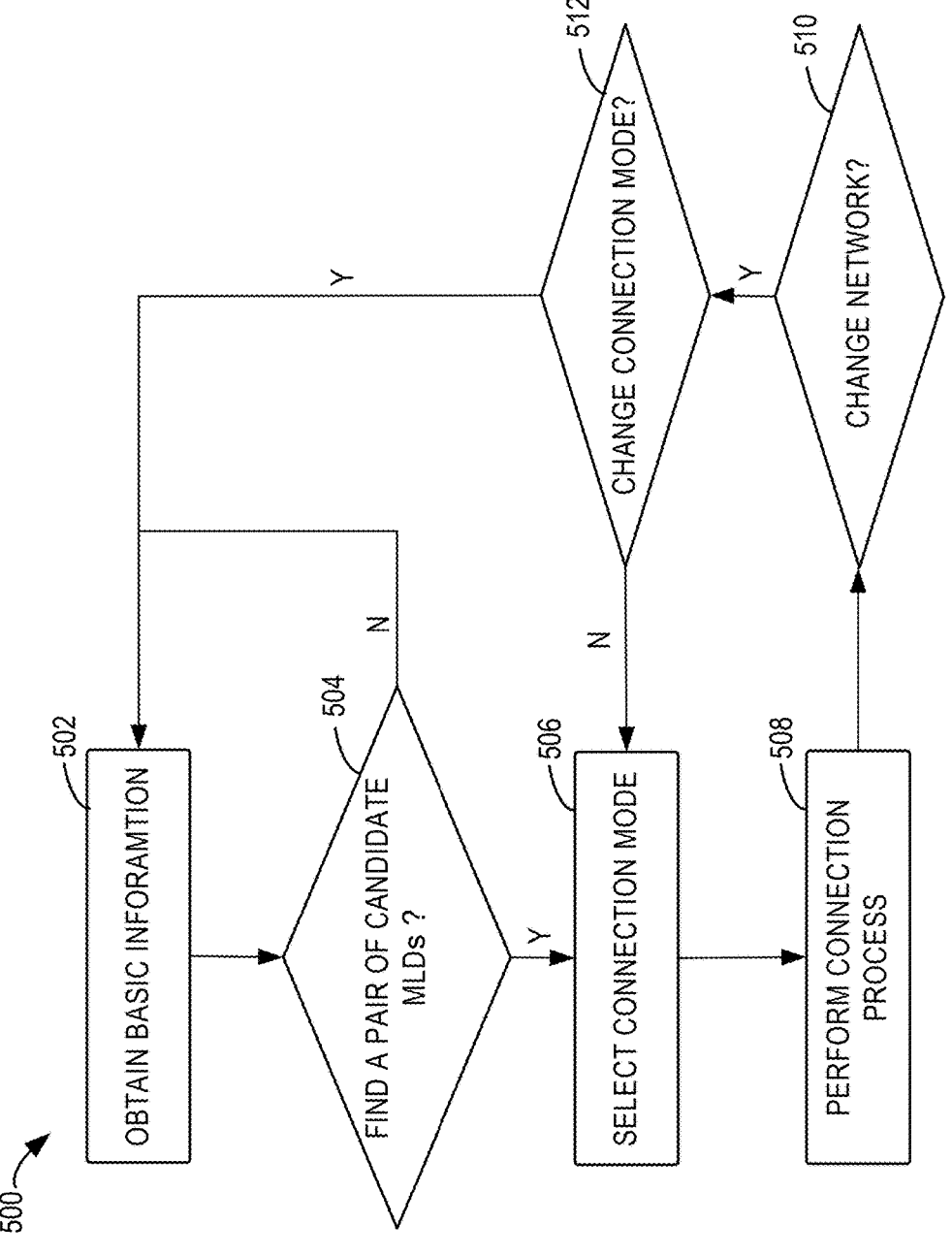
FIG. 5A illustrates an example creation process of multi-link communication in accordance with some implementations of the present disclosure.

For the purpose of discussion, the multi-link communication as shown in FIG. 5A will be described with reference to the MLDs as shown in FIG. 2. For example, the MLD 202 may obtain basic information on one or both of the MLDs 201 and 203, and/or other MLD(s) in the multi-link communication network 200. In an example implementation, the MLD 202 may determine whether to connect with the MLD 202 based on the basic information including RSSI, PHY capability and mode supported list for the MLD 201. In other words, once the MLD 202 is determined to be connected with the MLD 201, the MLD 202 and the MLD 201 can be determined as a pair of candidate MLDs to be connected with each other. Next, the MLD 202 may establish communication link(s) with the MLD 201 in any of the various modes as described above. In an example implementation, with the third type of mode, there are two communication links between the MLD 202 and the MLD 201, such as one link established between the AP 212 and the STA 221, and another link established between the STA 222 and the AP 211. The specific process for establishing the communication link(s) between the MLD 202 and the MLD 201 may refer to the implementation of the multi-link communication network 200 as described with the MLDs 201-202 in FIG. 2 above, and will not be repeated here for the sake of brevity.

In an example implementation, the mode selection at 506 may depend on the real network environment. If there is only one MLD, the connection process is predetermined to be performed according to the first type of mode. If more than three MLDs are present in real network environment, the third type of mode is predetermined to be applied to the connection process. If the downlink traffic is huger than the uplink traffic, the fourth type of mode will be predetermined.

Figure 5B:
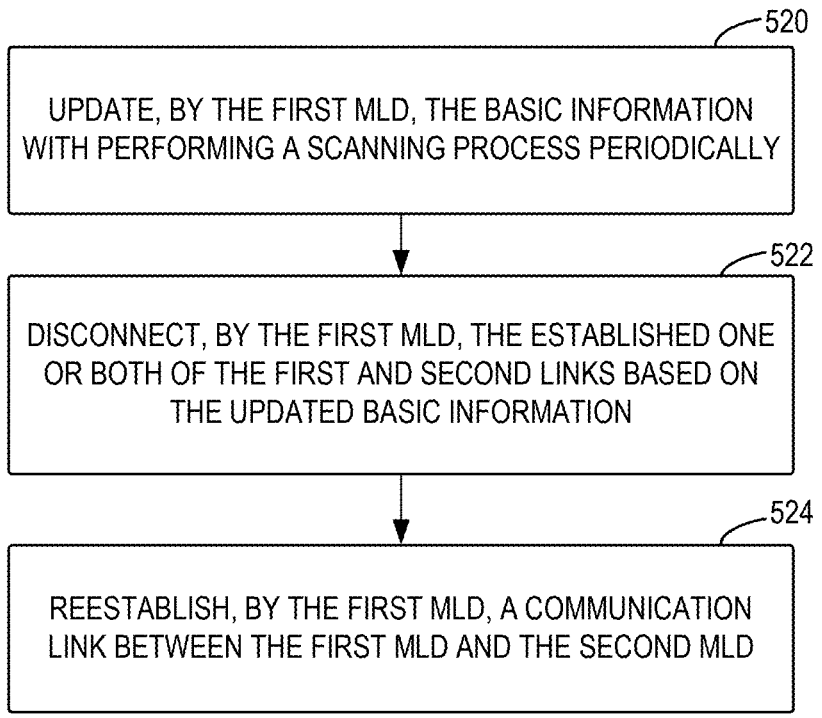
FIG. 5B illustrates further aspects of the example creation process of FIG. 5A.

In some example implementations, as the basic information may be updated by performing the scanning process periodically, the multi-link communication network architecture can be dynamically changed. As shown at 510 and 512, if the current network architecture and the selected mode are needed to be changed based on the updated basic information, the established links may be disconnected, and the scanning process may be performed again. If the current network architecture is needed to be changed and the selected mode is required to be maintained, only the established links may be disconnected, and a new type of mode may be selected at 506. That is, and as illustrated in FIG. 5B, a first MLD may update the basic information with performing a scanning process periodically (520). The first MLD may disconnect the established one or both of the first and second links based on the updated basic information (522). The first MLD may reestablish a communication link between the first MLD and the second MLD (524).

In an example implementation, when the multi-link communication network 200 is changed by excluding the MLD 201, the MLD 202 may disconnect with the MLD 202, and perform the scanning process again for obtaining updated basic information on other MLD(s) (at 502) in the multi-link communication network 200 except for the MLD 201. Then, the MLD 202 may establish communication link(s) with the other MLD(s) in the multi-link communication network 200 by repeating the processes as shown at 504-508.

In another example implementation, in the case that the connection mode of the MLDs 201 and 202 is needed to be changed, for example, when the communication link between the STA 222 and the AP 211 is needed to be disconnected, the connection mode for the MLD 202 may be changed from the third type of mode to the first type of mode. In yet another example implementation, the change in the multi-link communication herein may be the addition or removal of communication link(s) between MLDs in any of the multi-link communication network as described above.

It should be understood that the multi-link communication network herein may be changed in other manner(s), for example, adding new MLD(s) into the multi-link communication network. The connection modes of MLDs in the multi-link communication network herein may be changed in various manners, for example, from the third type of mode to the fourth type of mode or any other type of mode as described above.

FIG. 6A illustrates a flow chart of an example method 600 for multi-link communication according to implementations of the present disclosure. For the sake of illustration purposes, the method 600 will be described below with reference to the MLDs in FIG. 1.

At 602, a first STA of a first MLD receives, from a second AP of a second MLD, a frame including a medium access control (MAC) address associated with a second STA of the second MLD. For example, the STA 112 of MLD 102 receives a frame from the AP 111 of MLD 101, which includes the MAC address associated with the STA 121 of MLD 101. In some example implementations, the frame may be a beacon frame, and the MAC address associated with the STA 121 may be added to a vender element in the beacon frame. The beacon frame may further include other fields for optimizing the multi-link communication network, such as, a field indicating a predetermined type of the link to be established with the STA 121, a field indicating which radio channel the STA 121 is expected to run on, or a field indicating a predetermined basic service set identifier associated with the STA 121. When the beacon frame is received by the STA 112, the MLD 102 extracts the MAC address associated with the STA 121 and learns that the MLD 101 supports the multi-link function and is capable of communicating with the MLD 102 via first and second communication links.

In some example implementations, after the reception of the frame, the STA 112 may transmit an association request for establishing the link between the AP 111 and the STA 112. If the AP 111 may transmit association information for establishing the link between the AP 111 and the STA 112, the MLD 102 may establish this link by associating the STA 112 with the AP 111.

At 604, a first AP of the first MLD receives, from second STA of the second MLD, a request for establishing a link between the second STA and the first AP. For example, the AP 122 of MLD 102 receives a request from the STA 121 of MLD 101 to establish the link between the AP 122 and the STA 121. After the reception of this request, the MLD 102 may transmit corresponding association information and establish the corresponding link based on the association of the STA 121 and the AP 122.

At 606, the first MLD determines whether a MAC address in the request matches the MAC address associated with the second STA. For example, the MLD 102 determines whether a MAC address in the request from the STA 121 matches the MAC address in the frame from the AP 111. If not, the MLD 102 may merely establish the link between the AP 111 and the STA 112 or the link between the AP 122 and the STA 121.

At 608, in response to a determination that a MAC address in the request matches the MAC address associated with the second STA, the first MLD, and the second MLD establish a first link between the first AP and the second STA and a second link between the second AP and the first STA. For example, if the MAC address in the request from the STA 121 matches the MAC address in the frame from the AP 111, both the link between the AP 111 and the STA 112 and the link between the AP 122 and the STA 121 can be established simultaneously.

In some example implementations, a pair of candidate MLDs (such as the first MLD and the second MLD to be connected with each other) and one or both of the first and second links between the pair of candidate MLDs may be established based on basic information. The basic information may be obtained by the first MLD during a scanning process, and may be updated by performing the scanning process periodically. In an example implementation, one or both of the first and second links may be disconnected based on the updated basic information. The communication link between the first MLD and the second MLD may be reestablished.

Figure 6B:
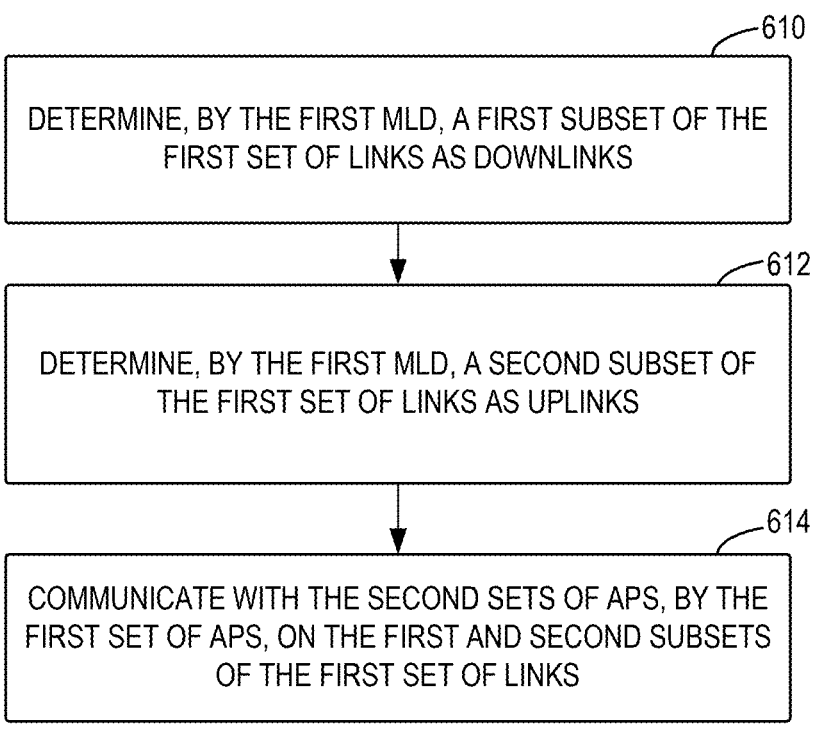
FIG. 6B illustrates further aspects of the example method of multi-link communication of FIG. 6A.

In some example implementations, the first AP (for example, AP 411) is included in a first set of APs (for example, APs 411 and 431, and other AP(s) not shown in FIG. 4), and the second STA (for example, STA 412) is included in a second set of STAs (for example, STAs 412 and 432, and other STA(s) not shown in FIG. 4). The first link (for example, LINK2) is included in a first set of links (for example, LINK2, LINK3 and other link(s) between AP(s) in MLD 401 and STA(s) in MLD 402 not shown in FIG. 4) on different radio channels, and each of the first set of links is established between one of the first set of APs and one of the second set of STAs. As illustrated in FIG. 6B, the first MLD may determine a first subset of the first set of links as downlinks (610), and a second subset of the first set of links as uplinks (612). The first set of APs may communicate with the second set of STAs on the first and second subsets of the first set of links (614). In an example implementation, the first or second subsets of the first set of links is determined as a downlink or an uplink based on a field indicating a predetermined type of a link to be established with the second set of STAs (such as a field included in the beacon frame) respectively.

Figure 6C:
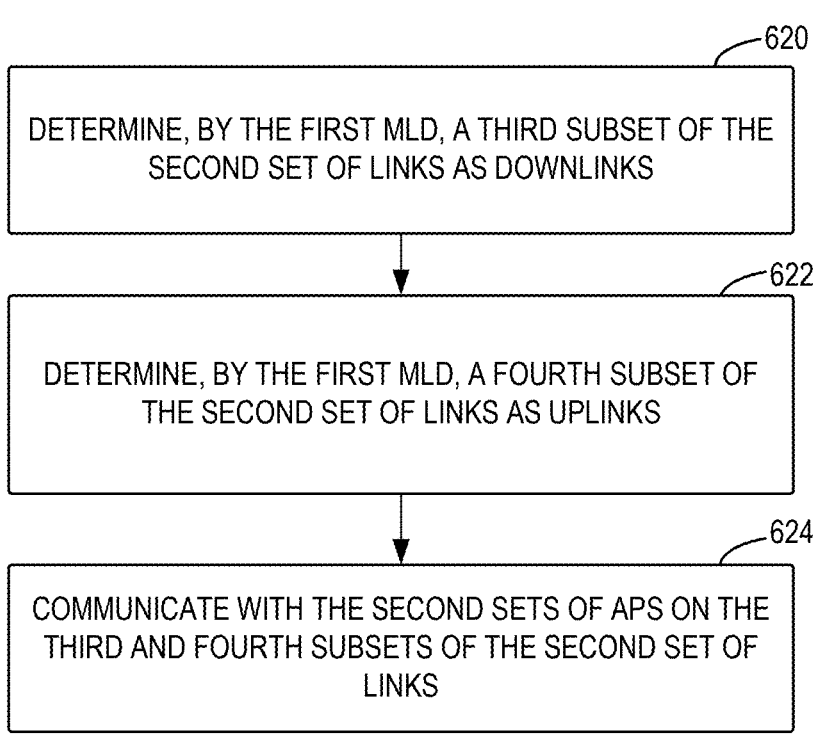
FIG. 6C illustrates further aspects of the example method of multi-link communication of FIG. 6A.

In some example implementations, the first STA (for example, STA 421) is included in a first set of STAs (for example, STA 421 and other STA(s) not shown in FIG. 4), and the second AP (for example, AP 422) is included in a second set of APs (for example, AP 422 and other AP(s) not shown in FIG. 4). The second link (for example, LINK1) is included in a second set of links (for example, LINK1 and other link(s) between STA(s) in MLD 401 and AP(s) in MLD 402 not shown in FIG. 4), and each of the second set of links is established between one of the first set of STAs and one of the second set of APs. As illustrated in FIG. 6C, the first MLD may determine a third subset of the second set of links as downlinks (620), and a fourth subset of the second set of links as uplinks (622). For example, the first set of STAs may communicate with the second sets of APs on the third and fourth subsets of the second set of links (624).

In this way, the method 600 according to implementations of the present disclosure can reduce the latency in the communication between MLDs, implement a better power-saving mechanism, and provide a multi-link communication network with enhanced stability.

FIG. 7 illustrates a block diagram of an example MLD 700 in accordance with some example implementations of the present disclosure. The MLD 700 comprises at least one processor 710 and a memory 720 coupled to the at least one processor 710, and the MLD 700 may be referred to as a first MLD. The memory 720 stores instructions to cause the at least one processor 710 to implement acts of a method according to implementations of the present disclosure.

As illustrated in FIG. 7, the memory 720 stores instructions 702 to receive a frame by a first STA of a first MLD from a second AP of a second MLD, the frame including a MAC address associated with a second STA of the second MLD. The memory 720 further stores instructions 704 to receive, by a first AP of the first MLD from the second STA of the second MLD, a request for establishing a link between the second STA and the first AP. The memory 720 further stores instructions 706 to determine whether a MAC address in the request matches the MAC address associated with the second STA. The memory 720 further stores instructions 708 to establish a first link between the first AP and the second STA and a second link between the second AP and the first STA in response to the determination that a MAC address in the request matches the MAC address associated with the second STA.

In some implementations, the memory 720 may further comprise instructions to obtain basic information of MLDs in any multi-link communication network as described above. The basic information may be used to determine which MLDs are to be connected via the communication links of the present disclosure. For example, the first MLD and the second MLD may be determined as a pair of candidate MLDs to be connected based on the basic information. In addition, or alternatively, the basic information may be updated by performing a scanning process periodically. The current architecture of the multi-link communication network may change based on the updated basic information. For example, the established one or both of the first and second links may disconnect, or other communication link(s) may be reestablished between the first MLD and the second MLD.

In some implementations, the first MLD may include a plurality of APs, the second MLD may include a plurality of second STAs, and there is a plurality of first links on different radio channels between the first and second MLDs. Each of the plurality of first links may be established between one of the plurality of first APs and one of the plurality of second STAs. In order to implement any of the various traffic flow steering strategies described above, the memory 720 may further comprise instructions to determine a first subset of the plurality of first links as downlinks, a second subset of the plurality of first links as uplinks based on a field indicating a predetermined type of a link to be established.

Similarly, the first MLD may include a plurality of first STAs, the second MLD may include a plurality of second APs, and there may be a plurality of second links between the first and second MLDs. Each of the plurality of second links may be established between one of the plurality of first STAs and one of the plurality of second APs. In some implementations, with any of the various traffic flow steering strategies described as above, the memory 720 may further comprise instructions to determine a third subset of the plurality of second links as downlinks and a fourth subset of the plurality of second links as uplinks.

In some implementations, the memory 720 may further comprise instructions 710 to monitor a frame transmitted from the second AP with a timer, and determine whether the second MLD is in a faulty state. If the frame fails to be received, the second MLD may be determined as being broken.

The present disclosure also provides at least one computer program product tangibly stored on a non-transitory computer-readable storage medium. The computer program product includes program codes or instructions which can be executed to carry out the method as described above.

While the above discussion used a Wi-Fi communication standard as an illustrative example, in other implementations, a wide variety of communication standards and, more generally, wireless communication technologies may be used. Furthermore, while some of the operations in the foregoing implementations were implemented in hardware or software, in general, the operations in the preceding implementations can be implemented in a wide variety of configurations and architectures. Therefore, some or all of the operations in the foregoing implementations may be performed in hardware, software, or both.

It should be noted that specific terms disclosed in the present disclosure are proposed for convenience of description and a better understanding of example implementations of the present disclosure, and the use of these specific terms may be changed to another format within the technical scope or spirit of the present disclosure.

Program codes or instructions for carrying out methods of the present disclosure may be written in any combination of one or more programming languages. These program codes or instructions may be provided to a processor or controller of a general-purpose computer, special-purpose computer, or other programmable data processing apparatus, such that the program codes, when executed by the processor or controller, cause the functions/operations specified in the flowcharts and/or block diagrams to be implemented. The program code or instructions may execute entirely on a machine, partly on the machine, as a stand-alone software package, partly on the machine and partly on a remote machine, or entirely on the remote machine or server.

In the context of this disclosure, a computer-readable medium may be any tangible medium that may contain or store a program for use by or in connection with an instruction execution system, apparatus, or device. The computer-readable medium may be a computer-readable signal medium or a computer-readable storage medium. A computer-readable medium may include but is not limited to an electronic, magnetic, optical, electromagnetic, infrared, or semiconductor system, apparatus, or device, or any suitable combination of the foregoing. More specific examples of the computer-readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Further, while operations are depicted in a particular order, this should not be understood as requiring that such operations be performed in the particular order shown or in sequential order or that all illustrated operations be performed to achieve desirable results. In certain circumstances, multitasking and parallel processing may be advantageous. Certain features that are described in the context of separate implementations may also be implemented in combination in a single implementation. Conversely, various features that are described in the context of a single implementation may also be implemented in multiple implementations separately or in any suitable sub-combination.

In the foregoing Detailed Description of the present disclosure, reference is made to the accompanying drawings that form a part hereof, and in which is shown by way of illustration how examples of the disclosure may be practiced. These examples are described in sufficient detail to enable those of ordinary skill in the art to practice the examples of this disclosure, and it is to be understood that other examples may be utilized and that process, electrical, and/or structural changes may be made without departing from the scope of the present disclosure.

What is claimed is:

1. A method comprising:

receiving, by a first station (STA) of a first multi-link device (MLD) and from a second access point (AP) of a second MLD, a frame including a medium access control (MAC) address associated with a second STA of the second MLD;

receiving, by a first AP of the first MLD and from the second STA of the second MLD, a request for establishing a link between the second STA and the first AP;

determining, by the first MLD, whether a MAC address in the request matches the MAC address associated with the second STA; and in response to a determination that a MAC address in the request matches the MAC address associated with the second STA, establishing a first link between the first AP and the second STA and a second link between the second AP and the first STA.

2. The method of claim 1, wherein the frame is a beacon frame, and establishing the first link between the first AP and the second STA comprises:

in response to receiving the request from the second STA, transmitting, by the first AP to the second STA, association information for establishing the first link; and associating, by the first MLD, the second STA with the first AP based at least in part on the request;

wherein the first link is established by the first MLD and with the second MLD, based on the association of the second STA and the first AP.

3. The method of claim 2, wherein establishing the second link between the second AP and the first STA comprises:

in response to receiving the beacon frame, transmitting, by the first STA to the second AP, an association request for establishing the second link;

receiving, by the first STA from the second AP, association information for establishing the second link; and associating, by the first MLD, the first STA with the second AP based on the association information;

wherein the second link is established, by the first MLD with the second MLD, based on the association of the first STA and the second AP.

4. The method of claim 1, further comprising:

obtaining, by the first MLD, basic information for the first MLD and the second MLD, wherein a pair of candidate MLDs including the first MLD and the second MLD is determined based on the basic information;

wherein the first MLD establishes one or both of the first and second links based on the basic information.

5. The method of claim 4, the method further comprises:

updating, by the first MLD, the basic information with performing a scanning process periodically;

disconnecting, by the first MLD, the established one or both of the first and second links based on the updated basic information; and reestablishing, by the first MLD, a communication link between the first MLD and the second MLD.

6. The method of claim 1, wherein the first AP is included in a first set of APs, the second STA is included in a second set of STAs, the first link is included in a first set of links on different radio channels, each of the first set of links is established between one of the first set of APs and one of the second set of STAs, and the method further comprises:

determining, by the first MLD, a first subset of the first set of links as downlinks;

determining, by the first MLD, a second subset of the first set of links as uplinks; and communicating, by the first set of APs and with the second set of STAs, on the first and second subsets of the first set of links.

7. The method of claim 6, wherein the frame further includes a field indicating a predetermined type of a link to be established with the second set of STAs, and the first subset of the first set of links or the second subset of the first set of links is determined as a downlink or an uplink based on the field indicating a predetermined type of a link to be established respectively.

8. The method of claim 1, wherein the first STA is included in a first set of STAs, the second AP is included in a second set of APs, the second link is included in a second set of links, each of the second set of links is established between one of the first set of STAs and one of the second set of APs, and the method further comprises:

determining, by the first MLD, a third subset of the second set of links as downlinks;

determining, by the first MLD, a fourth subset of the second set of links as uplinks; and communicating, by the first set of STAs with the second sets of APs, on the third and fourth subsets of the second set of links.

9. The method of claim 1, wherein the frame further includes one or more of the following:

a field indicating an index of the second STA;

a field indicating which radio channel the second STA is expected to run on; or a field indicating a predetermined basic service set identifier associated with the second STA.

10. The method of claim 1, the method further comprises:

monitoring, by the first STA, a frame transmitted from the second AP with a timer; and determining, by the first MLD, that the second MLD is in a faulty state based on a reception failure of the frame with the timer.

11. A first multi-link device (MLD) comprising:

at least one processor; and a memory coupled to the at least one processor, the memory storing instructions to cause the at least one processor to effectuate:

receiving, by a first station (STA) of the first MLD and from a second access point (AP) of a second MLD, a frame including a medium access control (MAC) address associated with a second STA of the second MLD;

receiving, by a first AP of the first MLD and from the second STA of the second MLD, a request for establishing a link between the second STA and the first AP;

determining, by the first MLD, whether a MAC address in the request matches the MAC address associated with the second STA; and in response to a determination that a MAC address in the request matches the MAC address associated with the second STA, establishing a first link between the first AP and the second STA and a second link between the second AP and the first STA.

12. The first MLD according to claim 11, wherein the frame is a beacon frame, the instructions to establish the first link between the first AP and the second STA comprise instructions to cause the at least one processor to effectuate:

in response to receiving the request from the second STA, transmitting, by the first AP to the second STA, association information for establishing the first link;

associating, by the first MLD, the second STA with the first AP based at least in part on the request;

wherein the first link is established by the first MLD and with the second MLD, based on the association of the second STA and the first AP.

13. The first MLD according to claim 12, wherein the instructions to establish the first link between the first AP and the second STA comprise instructions to cause the at least one processor to effectuate:

in response to receiving the beacon frame, transmitting, by the first STA to the second AP, an association request for establishing the second link;

receiving, by the first STA from the second AP, association information for establishing the second link;

associating, by the first MLD, the first STA with the second AP based on the association information; and wherein the second link is established by the first MLD with the second MLD, based on the association of the first STA and the second AP.

14. The first MLD according to claim 11, wherein the memory further stores instructions to cause the at least one processor to effectuate:

obtaining, by the first MLD, basic information for the first MLD and the second MLD, wherein a pair of candidate MLDs including the first MLD and the second MLD is determined based on the basic information;

wherein the first MLD establishes one or both of the first and second links based on the basic information.

15. The first MLD according to claim 14, wherein the memory further stores instructions to cause the at least one processor to effectuate:

updating, by the first MLD, the basic information with performing a scanning process periodically;

disconnecting, by the first MLD, the established one or both of the first and second links based on the updated basic information; and reestablishing, by the first MLD, a communication link between the first MLD and the second MLD.

16. The first MLD according to claim 11, wherein the first AP is included in a first set of APs, the second STA is included in a second set of STAs, the first link is included in a first set of links on different radio channels, each of the first set of links is established between one of the first set of APs and one of the second set of STAs, and the memory further stores instructions to cause the at least one processor to effectuate:

determining, by the first MLD, a first subset of the first set of links as downlinks;

determining, by the first MLD, a second subset of the first set of links as uplinks; and communicating, by the first set of APs and with the second set of STAs, on the first and second subsets of the first set of links.

17. The first MLD according to claim 16, wherein the frame further includes a field indicating a predetermined type of a link to be established with the second set of STAs, and the first subset of the first set of links or the second subset of the first set of links is determined as a downlink or an uplink based on the field indicating a predetermined type of a link to be established respectively.

18. The first MLD according to claim 11, wherein the frame further includes one or more of the following:

a field indicating an index of the second STA;

a field indicating which radio channel the second STA is expected to run on; or a field indicating a predetermined basic service set identifier associated with the second STA.

19. The first MLD according to claim 11, wherein the memory further stores instructions to cause the at least one processor to effectuate:

monitoring, by the first STA, a frame transmitted from the second AP with a timer; and determining, by the first MLD, that the second MLD is in a faulty state based on a reception failure of the frame with the timer.

20. A non-transitory computer-readable medium comprising instructions stored thereon which, when executed by a processor, cause the processor to effectuate:

receiving, by a first station (STA) of a first multi-link device (MLD) and from a second access point (AP) of a second MLD, a frame including a medium access control (MAC) address associated with a second STA of the second MLD;

receiving, by a first AP of the first MLD and from the second STA of the second MLD, a request for establishing a link between the second STA and the first AP;

determining, by the first MLD, whether a MAC address in the request matches the MAC address associated with the second STA; and in response to a determination that a MAC address in the request matches the MAC address associated with the second STA, establishing a first link between the first AP and the second STA and a second link between the second AP and the first STA.

* * * * *